United States Patent
Boch (10) Patent No.: US 10,887,430 B2
(45) Date of Patent: Jan. 5, 2021

(54) COMPRESSION IN COMMUNICATIONS

(71) Applicant: TRANSFORM-X, INC., Tucson, AZ (US)

(72) Inventor: Erik Boch, Ottawa (CA)

(73) Assignee: DRAGONWAVE-X, LLC, Tucson, AZ (US)

(*) Notice: Subject to any disclaimer, the term of this patent is extended or adjusted under 35 U.S.C. 154(b) by 41 days.

(21) Appl. No.: 15/298,943

(22) Filed: Oct. 20, 2016

(65) Prior Publication Data
US 2017/0118675 A1     Apr. 27, 2017

Related U.S. Application Data

(60) Provisional application No. 62/244,454, filed on Oct. 21, 2015.

(51) Int. Cl.
| | | |
|---|---|---|
| *H04L 29/06* | (2006.01) | |
| *H04W 28/06* | (2009.01) | |
| *H04L 29/08* | (2006.01) | |

(52) U.S. Cl.
CPC .......... *H04L 69/04* (2013.01); *H04L 29/0604* (2013.01); *H04L 29/0653* (2013.01); *H04L 29/08783* (2013.01); *H04L 29/08792* (2013.01); *H04L 67/2828* (2013.01); *H04L 69/22* (2013.01); *H04W 28/06* (2013.01)

(58) Field of Classification Search
CPC ............. H04L 29/0604; H04L 29/0653; H04L 29/08783; H04L 29/08792; H04L 67/2828; H04L 69/04; H04L 69/22; H04W 28/06
See application file for complete search history.

(56) References Cited

U.S. PATENT DOCUMENTS

| | | |
|---|---|---|
| 6,434,168 B1 | 8/2002 | Kari |
| 6,618,397 B1 | 9/2003 | Huang |
(Continued)

OTHER PUBLICATIONS

RFC 1144, Feb. 1990, 48 pages. Available from: http://www.ietf.org/rfc/rfc1144.txt.
(Continued)

*Primary Examiner* — Asad M Nawaz
*Assistant Examiner* — Kai Chang
(74) *Attorney, Agent, or Firm* — Fish & Richardson P.C.

(57) ABSTRACT

Methods and apparatus are provided for processing communication traffic that includes a plurality of traffic units, each traffic unit having a header and a payload. In one embodiment, header compression is selectively applied to headers of traffic units from the communication traffic, and bit-level bulk data compression is selectively applied to the communication traffic. The bit-level bulk data compression involves accumulating blocks of bits, including headers and payloads of traffic units from the communication traffic, and operating on each block individually. In another embodiment, bit-level bulk data decompression is selectively applied to the communication traffic, and header decompression is selectively applied to headers of traffic units from the communication traffic. The bit-level bulk data decompression involves accumulating blocks of bits, including headers and payloads of traffic units from the communication traffic, and operating on each block individually.

23 Claims, 5 Drawing Sheets

(56) References Cited

U.S. PATENT DOCUMENTS

| | | | | |
|---|---|---|---|---|
| 7,154,416 B1* | 12/2006 | Savage | ............... | H03M 7/30 |
| | | | | 341/51 |
| 7,372,843 B1* | 5/2008 | Asawa | ............... | H04W 28/02 |
| | | | | 370/349 |
| 7,420,992 B1* | 9/2008 | Fang | ............... | H04L 12/4633 |
| | | | | 370/477 |
| 7,610,330 B1* | 10/2009 | Quinn | ............... | H04L 45/02 |
| | | | | 709/201 |
| 7,640,362 B2 | 12/2009 | Brooks et al. | | |
| 7,894,458 B2* | 2/2011 | Jiang | ............... | H04L 12/18 |
| | | | | 370/401 |
| 7,924,843 B2 | 4/2011 | Matias et al. | | |
| 8,046,496 B1 | 10/2011 | Nucci et al. | | |
| 8,484,331 B2 | 7/2013 | Wing et al. | | |
| 8,619,816 B2 | 12/2013 | Peleg | | |
| 2003/0014764 A1* | 1/2003 | Saladino | ............... | H04L 12/2801 |
| | | | | 725/111 |
| 2005/0276247 A1 | 12/2005 | Heiman et al. | | |
| 2009/0169009 A1* | 7/2009 | Okamoto | ............... | H04W 12/04 |
| | | | | 380/273 |
| 2009/0290580 A1* | 11/2009 | Wood | ............... | H04L 63/0428 |
| | | | | 370/389 |
| 2010/0103953 A1* | 4/2010 | Matias | ............... | H04L 29/06027 |
| | | | | 370/477 |
| 2010/0284426 A1* | 11/2010 | Meloche | ............... | H04L 69/04 |
| | | | | 370/477 |
| 2010/0329255 A1 | 12/2010 | Singhal et al. | | |
| 2012/0106413 A1* | 5/2012 | Huang | ............... | H04L 69/22 |
| | | | | 370/310 |
| 2013/0019029 A1* | 1/2013 | Jagmohan | ............... | H03M 7/3068 |
| | | | | 709/247 |
| 2013/0039487 A1 | 2/2013 | McGrew | | |
| 2013/0145047 A1* | 6/2013 | Short | ............... | H04L 69/04 |
| | | | | 709/247 |
| 2014/0160932 A1* | 6/2014 | Venkatachalam Jayaraman | ............... | |
| | | | | H04L 69/04 |
| | | | | 370/235 |
| 2014/0233376 A1 | 8/2014 | Yu | | |
| 2014/0369365 A1* | 12/2014 | Denio | ............... | H04L 69/16 |
| | | | | 370/474 |
| 2015/0181459 A1* | 6/2015 | Zhu | ............... | H04L 65/1033 |
| | | | | 370/236 |
| 2015/0195326 A1* | 7/2015 | Suryavanshi | ............... | H04L 65/608 |
| | | | | 709/231 |
| 2015/0382233 A1* | 12/2015 | Oprescu-Surcobe | ............... | |
| | | | | H04W 28/04 |
| | | | | 370/312 |
| 2016/0309363 A1* | 10/2016 | Persson | ............... | H04L 69/04 |
| 2016/0337255 A1* | 11/2016 | Balasubramanian | ............... | H04L 69/04 |
| 2016/0352492 A1* | 12/2016 | De Wit | ............... | H04W 24/08 |
| 2017/0085615 A1* | 3/2017 | Agrawal | ............... | H04L 69/04 |

OTHER PUBLICATIONS

Prkic, Bernard, "Bandwidth Acclerator+ for affordable 4G+ backhaul", Oct. 29, 2014, 5 pages. Available from: http://www.dragonwaveinc.com/system/files/2014-11-03_article_bandwidthacceleratorforaffordable4gbackhaul_0.pdf.

Tan et al., "Improving Quality-of-Service of Real-Time Applications over Bandwidth Limited Satellite Communication Networks via Compression, Advances in Satellite Communications", Dr. Masoumeh Karimi (Ed.), ISBN: 978-953-307-562-4, InTech, 2011, 27 pages. Available from: http://www.intechopen.com/books/advances-in-satellite-communications/improving-guality-of-service-of-realtime-applications-over-bandwidth-limited-satellite-communication_networks_via_compression.pdf.

M. Degermark et al., "IP header compression" RFC 2507, Internet Engineering Task Force, Feb. 1999, 47 pages.

* cited by examiner

COMPRESSION IN COMMUNICATIONS

CROSS-REFERENCE TO RELATED APPLICATION

This application claims the benefit of U.S. Provisional Patent Application No. 62/244,454 entitled "Compression in Communications" filed Oct. 21, 2015, the entire content of which is incorporated herein by reference.

FIELD OF THE INVENTION

The invention relates generally to communications and more particularly to apparatus and methods for compressing and decompressing traffic units in communication traffic.

BACKGROUND

Nodes/devices in a communication network exchange information between each other. This information may include segments or units of traffic, such as packets, which may include overhead information and payload information. Overhead information may include header information, for example, that may be useful in routing a packet through the network, identifying the content in the packet, processing the packet, etc. Payload information could include user data, multimedia content, etc. in a payload portion of the packet.

SUMMARY

According to one aspect of the present invention, there is provided a method of processing communication traffic comprising a plurality of traffic units, each traffic unit having a header and a payload, the method comprising: selectively applying header compression to headers of traffic units from the communication traffic; selectively applying bit-level bulk data compression to the communication traffic, wherein bit-level bulk data compression comprises accumulating blocks of bits, including headers and payloads of traffic units from the communication traffic, and operating on each block individually.

In some embodiments, the communication traffic comprises a plurality of traffic flows, each traffic flow comprising a plurality of traffic units, and selectively applying header compression to headers of traffic units from the communication traffic comprises selectively applying header compression to headers of traffic units from the plurality of traffic flows on a flow-by-flow basis.

In some embodiments, the method further comprises: identifying a traffic flow type for each traffic flow of the plurality of traffic flows, wherein selectively applying header compression to headers of traffic units from the plurality of traffic flows on a flow-by-flow basis comprises, for each traffic flow, selectively applying header compression to headers of traffic units from the traffic flow depending, at least in part, on the traffic flow type identified for the traffic flow.

In some embodiments, the communication traffic comprises a plurality of traffic flows, each traffic flow comprising a plurality of traffic units, and selectively applying bit-level bulk data compression to the communication traffic comprises selectively applying bit-level bulk data compression to the plurality of traffic flows on a flow-by-flow basis.

In some embodiments, the method further comprises: identifying a traffic flow type for each traffic flow of the plurality of traffic flows, wherein selectively applying bit-level bulk data compression to the plurality of traffic flows on a flow-by-flow basis comprises, for each traffic flow, selectively applying bit-level bulk data compression to the traffic flow depending, at least in part, on the traffic flow type identified for the traffic flow.

In some embodiments, the method further comprises receiving the communication traffic from a plurality of traffic queues, wherein selectively applying header compression to headers of traffic units from the communication traffic comprises selectively applying header compression to headers of traffic units from the communication traffic on a queue-by-queue basis.

In some embodiments, the method further comprises receiving the communication traffic from a plurality of traffic queues, wherein selectively applying bit-level bulk data compression to the communication traffic comprises selectively applying bit-level bulk data compression to the communication traffic on a queue-by-queue basis.

In some embodiments, the bit-level bulk data compression is lossless.

In some embodiments, a size of the blocks upon which the bit-level bulk data compression operates is user selectable.

According to another aspect of the present invention, there is provided a non-transitory computer-readable medium storing instructions which, when executed, perform the method according to the above aspect of the present invention.

According to yet another aspect of the present invention, there is provided an apparatus for processing communication traffic comprising a plurality of traffic units, each traffic unit having a header and a payload, the apparatus comprising: a header compressor to selectively apply compression to headers of traffic units from the communication traffic; a bit-level bulk data compressor, operatively coupled to an output of the header compressor, to selectively apply bit-level bulk data compression to the communication traffic, wherein bit-level bulk data compression accumulates blocks of bits, including headers and payloads of traffic units from the communication traffic, and operates on each block individually.

In some embodiments: the communication traffic comprises a plurality of traffic flows, each traffic flow comprising a plurality of traffic units; and the header compressor is configured to selectively apply header compression to headers of traffic units from the plurality of traffic flows on a flow-by-flow basis.

In some embodiments, for each traffic flow of the plurality of traffic flows, the header compressor is configured to selectively apply header compression to headers of traffic units from the traffic flow depending, at least in part, on a traffic flow type identified for the traffic flow.

In some embodiments: the communication traffic comprises a plurality of traffic flows, each traffic flow comprising a plurality of traffic units; and the bit-level bulk data compressor is configured to selectively apply bit-level bulk data compression to the plurality of traffic flows on a flow-by-flow basis.

In some embodiments, for each traffic flow of the plurality of traffic flows, the bit-level bulk data compressor is configured to selectively apply bit-level bulk data compression to the traffic flow depending, at least in part, on a traffic flow type identified for the traffic flow.

In some embodiments: the communication traffic is received from a plurality of traffic queues; and the header compressor is configured to selectively apply header compression to headers of traffic units from the communication traffic on a queue-by-queue basis.

In some embodiments: the communication traffic is received from a plurality of traffic queues; and the bit-level bulk data compressor is configured to selectively apply bit-level bulk data compression to the communication traffic on a queue-by-queue basis.

In some embodiments, the bit-level bulk data compressor is configured to instantiate a plurality of bit-level bulk data compressor instances, each bit-level bulk data compressor instance being individually configurable to selectively apply bit-level bulk data compression to the communication traffic by accumulating blocks of bits from at least one of the traffic queues, and operating on each block individually.

In some embodiments, the bit-level bulk data compression selectively applied by the bit-level bulk data compressor is lossless.

In some embodiments, the size of the blocks upon which the bit-level bulk data compressor operates is user selectable.

According to still another aspect of the present invention, there is provided a method of processing communication traffic comprising a plurality of traffic units, each traffic unit having a header and a payload, the method comprising: selectively applying bit-level bulk data decompression to the communication traffic, wherein bit-level bulk data decompression comprises accumulating blocks of bits, including headers and payloads of traffic units from the communication traffic, and operating on each block individually; selectively applying header decompression to headers of traffic units from the communication traffic.

In some embodiments, the method further comprises receiving bit-level bulk data decompression information in respect of the communication traffic, wherein the bit-level bulk data decompression information in respect of the communication traffic is used when selectively applying bit-level bulk data decompression to the communication traffic.

According to a further aspect of the present invention, there is provided a non-transitory computer-readable medium storing instructions which, when executed, perform the method according to the above aspect of the present invention.

According to still another aspect of the present invention, there is provided an apparatus for processing communication traffic comprising a plurality of traffic units, each traffic unit having a header and a payload, the apparatus comprising: a bit-level bulk data decompressor to selectively apply bit-level bulk data decompression to the communication traffic, wherein bit-level bulk data decompression accumulates blocks of bits, including headers and payloads of traffic units from the communication traffic, and operates on each block individually; a header decompressor, operatively coupled to an output of the bit-level bulk data decompressor, to selectively apply header decompression to headers of traffic units from the communication traffic.

In some embodiments, the bit-level bulk data decompressor is configured to receive bit-level bulk data decompression information in respect of the communication traffic and use the bit-level bulk data decompression information when selectively applying bit-level bulk data decompression to the communication traffic.

BRIEF DESCRIPTION OF THE DRAWINGS

Examples of embodiments of the invention will now be described in greater detail with reference to the accompanying drawings.

DETAILED DESCRIPTION

Generally, embodiments of the present invention provide apparatus and methods for compressing and decompressing traffic units in communication traffic. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

In many forms of communication, and particularly in wireless communication, bandwidth resources for transmission of communication traffic is often limited. In many communication systems, information is communicated in units of traffic, such as packets or frames, that each include some overhead information, in the form of a header, and a payload that carries at least some portion of information. These units are generally referred to herein as traffic units.

Figure 1:
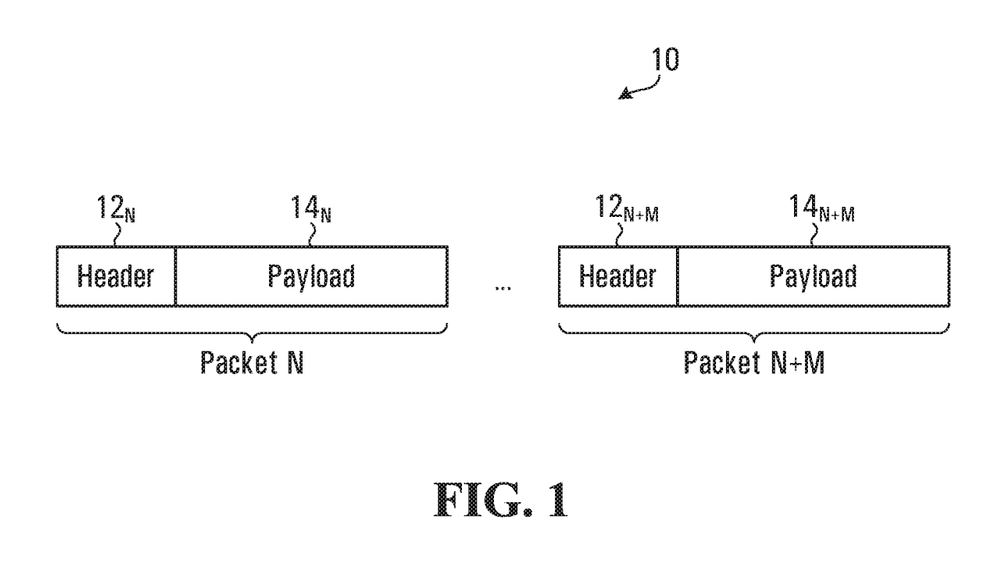
FIG. 1 is a block diagram of an example packet flow.

A sequence of traffic units from a source to a destination (unicast), or to multiple destinations (multicast or broadcast), may be considered a traffic flow. For example, in a packet switched network, a sequence of packets from a source to one or more destinations may be considered a packet flow. FIG. 1 is a block diagram of an example packet flow 10 that depicts M packets (packet N to packet N+M) in the flow. As shown in FIG. 1, each packet in the flow includes a header and a payload, such that packet N includes a header $12_N$ and a payload $14_N$, and packet N+M includes a header $12_{N+M}$ and a payload $14_{N+M}$. The traffic units (packets in this example) in a traffic flow (packet flow in this example) often share similar headers, which means that in a traffic flow there is often at least a portion of a header that is repeated across multiple traffic units.

In some cases, the header (i.e. overhead information) may occupy a relatively large portion of a traffic unit. For example, in short packet flows, the packet header may occupy a relatively large portion of a packet. Accordingly, transmission of information in such traffic units may be relatively inefficient because much of the bandwidth for transmitting information may be used to transmit header information as opposed to the actual payload information.

In some communication systems, the header portion of traffic units may be compressed prior to transmission in order to reduce the amount of overhead information that is transmitted. This type of compression is referred to as header compression, because it operates on overhead information in the header portion of a traffic unit.

Header compression can potentially provide a substantial improvement in efficiency for communication traffic that includes traffic units in which the header occupies a relatively large portion of each traffic unit and the traffic is repetitive in the sense that many of the traffic units share a common header or at least portions of the headers in different traffic units are common. For example, in some cases header compression has been shown to be well suited to low data rate Voice over Internet Protocol (VoIP) communications.

In contrast, compression schemes that compress the payload portion of a traffic unit often yield better results, in terms of higher compression gain, for communication traffic that includes traffic units in which the payload occupies a relatively large portion of each traffic unit. A packet flow for a File Transfer Protocol/Transmission Control Protocol (FTP/TCP) communication may generate such communication traffic.

Bit-level bulk data compression operates by accumulating blocks of data from communication traffic, including headers and payloads from multiple traffic units in the communication traffic, and operating on each block individually. This type of compression is generally suited for compressing blocks of data in communication traffic with embedded repetitive patterns.

However, such bit-level bulk data compression may not provide acceptable compression results for low data rate communication traffic with randomized or generally less repetitive data, because the bulk compression process operates on a block of data (e.g., 8000 bytes) at a time and performs compression on the block. For some types of traffic flows that are low data rate in nature, such as low data rate VoIP packet flows, the traffic units associated with the flows are spaced such that there are not multiples of the same flow in a bulk compressed block. This means that even though a traffic flow may include repetitive content, such as in the header portions of its traffic units, this repetitive pattern may not be exploited by bit-level bulk data compression that operates on blocks of data individually.

Performing bit-level bulk data compression on larger blocks and/or across multiple blocks in order to potentially exploit the repetitive content of some low data rate traffic flows that may be missed in a single smaller block of data is often not feasible. For example, there is an additional delay penalty associated with processing across larger blocks or across multiple blocks, as it takes longer to accumulate and process the data block or blocks for compression.

Aspects of the present invention provide methods and apparatus that combine selective application of header compression with selective application of bit-level bulk data compression for communication traffic processing.

This combination can potentially be advantageous, for example, for traffic flow types that may not compress well in bulk compression, due to having a low data rate for example, but have compressible overhead information that can be compressed by applying header compression to the traffic flow instead of, or prior to, bulk compression.

Bulk data compression operates on blocks of data. Therefore the delay associated with accumulating a block of data means that bulk data compression is a non-real time form of compression. The delay that may be incurred accumulating a block of traffic to be compressed may be at least partially offset by an acceleration in transmitting the compressed traffic, because the compressed version of the block is of a reduced size, meaning that less data has to be sent and therefore can potentially be sent in less time. However, some communication traffic may be particularly sensitive to delay. For such traffic, it may be preferable to not apply bulk data compression to the traffic, even if the delay associated with bulk data compression is at least partially mitigated by the potentially reduced data size due to the compression.

Figure 2:
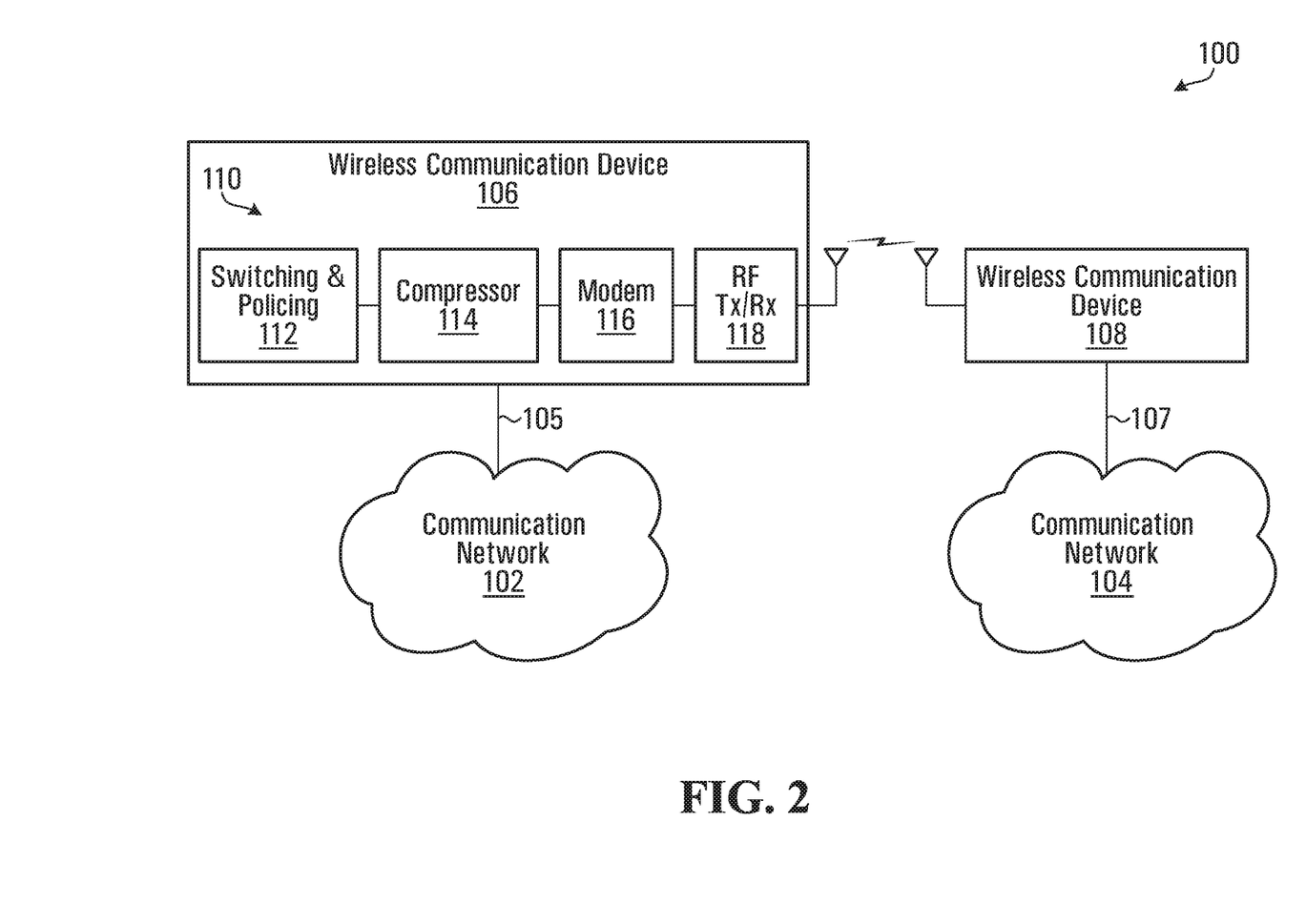
FIG. 2 is a block diagram of an example communication system.

FIG. 2 is a block diagram of an example communication system 100. Communication system 100 includes a first wireless communication device 106, a second wireless communication device 108, a first communication network 102, and a second communication network 104. First wireless communication device 106 is communicatively coupled to network 102 through a communication link 105 and second wireless communication device 108 is communicatively coupled to communication network 104 through a communication link 107.

In one embodiment, the communication networks 102 and 104 are Ethernet networks.

The communication link 105 between wireless communication device 106 and communication network 102, and the communication link 107 between wireless communication device 108 and communication network 104, may be wired communication links, wireless communication links, or some combination thereof.

The communications circuitry used to implement wireless communication devices 106 and 108 is implementation-dependent. In general, hardware, firmware, components which execute software, or some combination thereof, might be used in implementing such communications circuitry. Electronic devices that might be suitable for implementing communications circuitry include, among others, microprocessors, microcontrollers, Programmable Logic Devices (PLDs), Field Programmable Gate Arrays (FPGAs), Application Specific Integrated Circuits (ASICs), and other types of "intelligent" integrated circuits. Software could be stored in memory for execution. The memory could include one or more physical memory devices, including any of various types of solid-state memory devices and/or memory devices with movable or even removable storage media.

Although the communication system 100 depicted in FIG. 2 includes only two communication networks 102 and 104, each having only one wireless communication device communicatively coupled thereto, more generally a communication system may include any number of communication networks, each having any number of wireless communication devices respectively coupled thereto. Furthermore, in some embodiments wireless communication devices, such as wireless communication devices 106 and 108, may be configured to transmit wireless signals to and/or receive wireless communication signals from multiple other wireless communication devices. In some embodiments, wireless communication devices communicatively coupled to the same communication network may communicate wirelessly with one another. In one specific embodiment, wireless communication devices and communication networks are arranged to provide an Ethernet mesh/ring network.

Wireless communication device 106 receives communication traffic (e.g., in the form of data packets) that is routed through communication network 102, generates wireless communication signals based on the communication traffic, and transmits the wireless communication signals to wireless communication device 108. Wireless communication device 108 receives wireless communication signals from wireless communication device 106, generates communication traffic based on the wireless communication signals, and sends the generated communication traffic to one or more nodes in communication network 104. Similarly, wireless communication devices 106 and 108 may be configured so that communication traffic routed through communication network 104 and received at wireless communication device 108 can be wirelessly transmitted to and received by wireless communication device 106 to be routed to one or more nodes in communication network 102.

A portion of an example communication traffic processing chain 110 for wireless communication device 106 is also shown in FIG. 2. The example communication traffic processing chain 110 includes a switching and policing module 112, a compressor 114, a modem 116 and a radio frequency (RF) transmit/receive device 118. The switching and policing module 112 is operatively coupled to the compressor 114, which is in turn operatively coupled to the modem 116, which is in turn operatively coupled to the RF transmit/receive device 118. The switching and policing module 112, the compressor 114, the modem 116 and the RF transmit/receive device 118 could be implemented in hardware, firmware, one or more components, such as a processor, that execute software, or combinations thereof.

In operation, the switching and policing module 112 performs a switching and policing function on communication traffic that includes traffic units such as packets, that each have a header and a payload. In some embodiments, the switching and policing function performed by the switching and policing module 112 includes sorting traffic units into a plurality of traffic queues in one or more memory devices (not shown in FIG. 2) based, for example, on traffic type. For example, in some embodiments the switching and policing module 112 sorts each packet flow of multiple packet flows into one of multiple traffic queues based on a traffic type identified for the packet flow. In such embodiments, packet flows of a first traffic type, illustratively VoIP traffic, may be sorted into a first traffic queue, while packet flows of a second traffic type, such as FTP/TCP, may be sorted into a second traffic queue.

Compressor 114 receives communication traffic that has been processed by the switching and policing module 112 and further processes the communication traffic by selectively applying header compression to headers of traffic units from the communication traffic, and selectively applying bit-level bulk data compression to the communication traffic. The bit-level bulk data compression accumulates blocks of bits, including headers and payloads of traffic units from the communication traffic, and operates on each block individually. In some embodiments, the size of the blocks upon which the bit-level bulk data compression operates is user selectable.

In some embodiments, the communication traffic includes multiple traffic flows, and each traffic flow includes multiple traffic units. In such embodiments, the compressor 114 may be configured to selectively apply header compression and/or bit-level bulk data compression to the communication traffic on a flow-by-flow basis. In some cases, a traffic flow type may be identified for each traffic flow, and the compressor 114 may selectively apply header compression and/or bit-level bulk data compression to a traffic flow based, at least in part, on the traffic flow type associated with the traffic flow.

Table 1 below illustrates the complementary nature of header compression and bit-level bulk data compression for various types of communication traffic, showing the potential benefit that may be realized by selectively combining header compression and bit-level bulk data compression.

TABLE 1

| Traffic Type | Compression Efficiency for Header Compression | Compression Efficiency for Bulk Data Compression |
| --- | --- | --- |
| Low data rate, short traffic unit flows (e.g., VoIP) | High | Low |
| High data rate, short traffic unit flows (e.g., VidoIP, TDMoE) | Medium-High | Low-Medium |
| Low data rate, long traffic unit flows (e.g., FTP/TCP) | Low | High |
| High data rate, long traffic unit flows (e.g., FTP/TCP) | Low | High |
| Encrypted flows | High | Low |

As illustrated in Table 1, header compression can provide gains on short traffic unit flows with traffic units that are relatively short, so that the header occupies a significant portion of the size of each traffic unit. On the other hand, bulk data compression can provide gains on blocks of data from long traffic unit flows with bit-level sequences, including headers and payloads of traffic units, that exhibit compressible sequences or patterns.

Selectively applying the header compression and bulk data compression on a flow-by-flow basis, for example, potentially allows header compression and/or bulk data compression to be applied to those flows that may benefit from one compression scheme or the other, or both, while bypassing header compression and/or bulk data compression for other flows. For example, some traffic flows may be particularly sensitive to any delay, and therefore for such flows it may be preferable to bypass bulk data compression.

Traffic flow type is only one example of a criterion upon which the selective application of header compression and/or bit-level bulk data compression may be based. One or more other criteria could potentially be used in addition to or instead of traffic flow type in other embodiments.

In some embodiments, the compressor 114 may be configured to selectively apply header compression and/or bulk data compression based on the switching and policing configuration determined by switching and policing module 112. For example, the switching and policing module 112 may sort communication traffic into traffic queues, and the compressor 114 may be configured to selectively apply header compression and/or bulk data compression on a queue-by-queue basis.

Further details of compressor 114 and an example implementation are discussed later with reference to FIG. 3.

Modem 116 and RF transmit/receive device 118 function as an RF front end for wireless communication device 106. Modem 116 modulates the processed communication traffic from compressor 114 to generate signals suitable for wireless transmission, which RF Tx/Rx 118 then uses to generate wireless communication signals to transmit the processed communication traffic.

Details of the communication circuitry of wireless communication device 108 are not shown in FIG. 2, but in one embodiment they include an RF front end configured to receive wireless communication signals and demodulate the wireless communication signals to generate communication traffic, and a decompressor configured to selectively apply bit-level bulk data decompression to the communication traffic, and then selectively apply header decompression to headers of traffic units from the communication traffic. As with the bit-level bulk data compression, the bit-level bulk data decompression involves accumulating blocks of bits from the communication traffic, and operating on each block individually. Further details of a decompressor and an example implementation are discussed later with reference to FIG. 4.

It should also be appreciated that both a compression/transmit communication traffic processing chain such as 110 and a decompression/receive communication traffic processing chain could be implemented in a single communication device. In many implementations, communication devices or equipment support transmit and receive capabilities and therefore a single device or equipment installation could include compression/transmit and receive/decompression circuitry.

Figure 3:
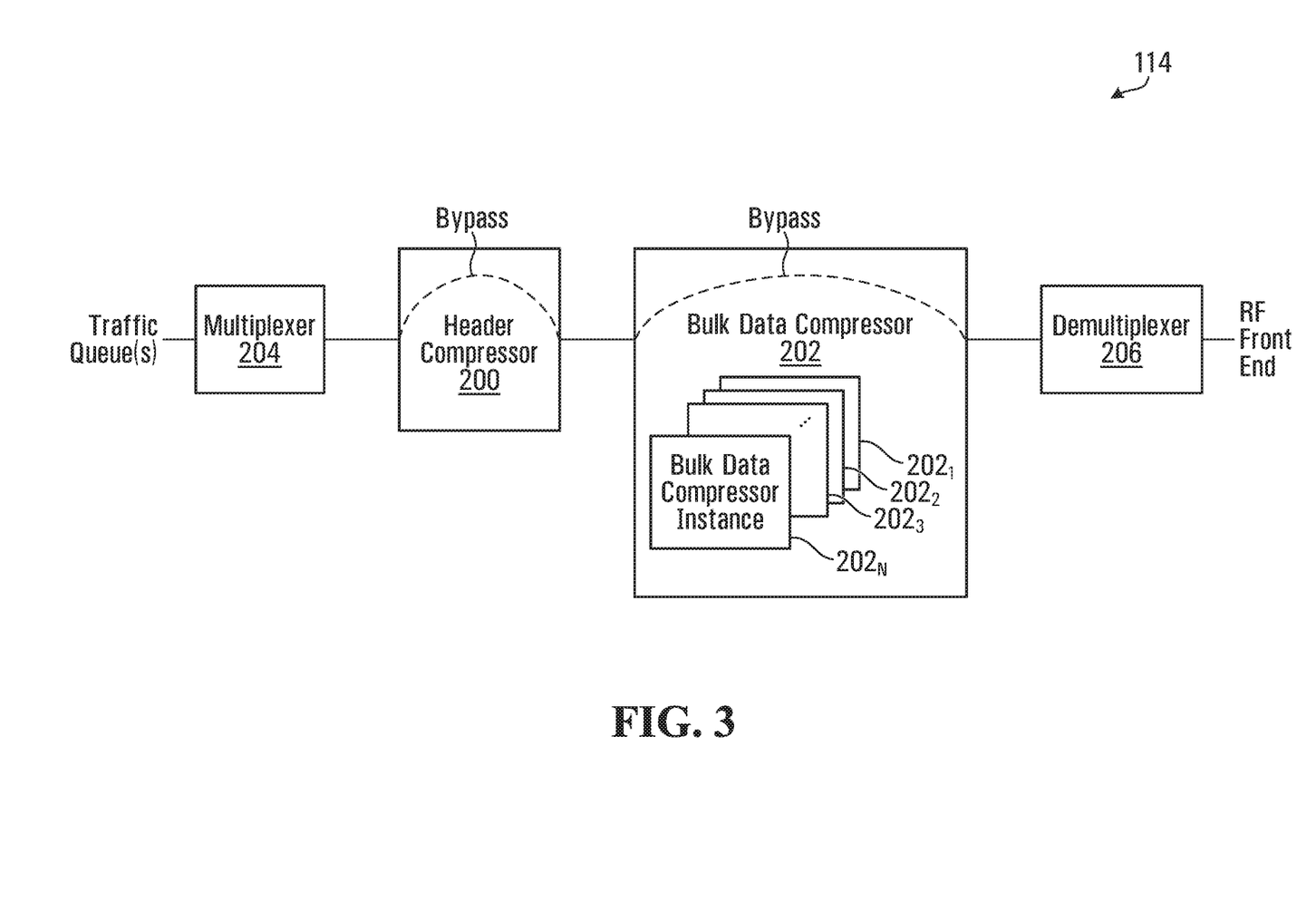
FIG. 3 is a block diagram of an example apparatus for compressing communication traffic.

Referring now to FIG. 3, which is a block diagram of an example apparatus for implementing compressor 114, the compressor 114 includes a multiplexer 204, which is operatively coupled to a header compressor 200, which in turn is operatively coupled to a bit-level bulk data compressor 202, which in turn is operatively coupled to a demultiplexer 206. The multiplexer 204, header compressor 200, bit-level bulk data compressor 202, and demultiplexer 206 could be implemented in hardware, firmware, one or more components, such as a processor, that execute software, or combinations thereof.

In operation, multiplexer 204 receives communication traffic from one or more traffic queues, for example, and multiplexes the communication traffic into a stream of traffic units for processing by header compressor 200.

Header compressor 200 selectively applies header compression to the communication traffic received from multiplexer 204 and passes the resulting communication traffic to bit-level bulk data compressor 202. The selective application of header compression by header compressor 200 is depicted by way of a dashed-line bypass path through header compressor 200. This is intended to indicate that header compressor 200 may be configured such that it may apply header compression to some communication traffic, while not applying header compression to other communication traffic.

In some embodiments, header compressor 200 is configurable to selectively apply header compression by selectively operating in either an "on" state or an "off" state. In such embodiments, when in the "on" state, header compressor 200 applies header compression to all communication traffic, whereas when in the "off" state, it does not apply header compression to any communication traffic.

The communication traffic received by the header compressor 200 may include multiple traffic flows that each include multiple traffic units. In some cases, header compressor 200 may be configured to selectively apply header compression to headers of traffic units from the traffic flows on a flow-by-flow basis. For example, header compressor 200 may apply header compression to headers of communication traffic units from one traffic flow, while not applying header compression to headers of communication traffic units from another traffic flow.

In some embodiments, header compressor 200 is configured such that, for each of the multiple traffic flows, it selectively applies header compression to headers of traffic units from the traffic flow depending, at least in part, on a traffic flow type identified for the traffic flow. For example, header compressor 200 may be configured to apply header compression to traffic flow(s) identified as being of a first traffic flow type, such as VoIP, VidoIP (Video over IP) or TDMoE (Time Division Multiplexing over Ethernet), and configured to not apply header compression to traffic flow(s) identified as being of a second traffic flow type, such as FTP/TCP.

In the example apparatus shown in FIG. 3, the multiplexer 204 receives the communication traffic from one or more traffic queues. In some embodiments, header compressor 200 is configured to selectively apply header compression to headers of traffic units from the communication traffic on a queue-by-queue basis. In some cases, the communication traffic may have been sorted into traffic queues based on one or more criteria, such as priority, desired data rate, and/or traffic flow type.

In one embodiment, the header compression applied by header compressor 200 is based on a modified version of the IP header compression technique described in "IP header compression" RFC 2507, Internet Engineering Task Force (1999) by S. Pink, M. Degermark, and B. Nordgren.

In one example embodiment, header compressor 200 monitors communication traffic to identify traffic unit flows, and builds a watched list stored in memory (not shown) of traffic flows that it has identified. In one particular embodiment the watched list may include approximately 4000 of the most recent traffic unit flows that header compressor 200 has identified. The specific size of the watched list may be different in different embodiments. For example, in some embodiments it may be larger than 4000, and in other embodiments it may be smaller.

From the watched list, header compressor 200 may extract a smaller most commonly seen list that includes, for example approximately 1000 of the most commonly recurring traffic flows in the watched list. In an embodiment, each time a new entry is made in the most commonly seen list, a traffic unit belonging to the traffic flow corresponding to the new entry is transmitted to the far-end of the communication link corresponding to the traffic flow together with a compression context-identification (CID). In FIG. 2, for example, the far-end with respect to wireless communication device 106 is wireless communication device 108. Subsequent traffic units with header information matching an entry on the most commonly seen list have their matching header information replaced with the CID corresponding to their matching entry before being transmitted to the far-end. An entire header or a portion of the header could be replaced, depending on the extent of the match. At the far-end, the original header information is substituted for the CIDs in a header decompression process. In some embodiments, an error check may then be carried out, such as a cyclic redundancy check (CRC). Errored traffic units may be discarded, while non-errored traffic units may be forwarded for further processing.

According to the above embodiment, when a given traffic flow stops or slows, and thus begins to recur less often in the watched list, it naturally gets removed from the most commonly seen list, as other traffic flows begin to recur more regularly in the watched list.

In one example embodiment, header compressor 200 selectively applies header compression to headers of traffic units by initially classifying each traffic unit into one of multiple traffic unit header types. For example, in one such embodiment each traffic unit may be classified into one of four possible header types: uncompressible, compressible non-IP, compressible non-TCP and compressible TCP. In some such embodiments, the header compression applied to a traffic unit is in accordance with the header type classification for the traffic unit. In some cases, header compression is executed in layers, meaning that header compression may operate on a portion of a header, while leaving one or more other portions of the header uncompressed. By operating in this manner, in some cases even "exotic" headers that may include one or more portions that may not be compressible with a particular header compression algorithm, may be at least partially compressed. Header compression could operate on only the portion(s) of such a header that may be compressible by the header compression algorithm, while not operating on the portion(s) that may not be compressible by the header compression algorithm.

In many cases, header compression can be performed in real time or near-real time operation, and thus causes little to no delay. Header compression is lossless, meaning that compressed headers can be decompressed without any loss of information. It may also be possible to implement header compression so that it is non-expanding.

In some embodiments, information pertaining to header compression/decompression, such as tables mapping CIDs to header information, and tables for the most commonly seen list and the watched list, may be stored in a manner that allows the information to survive through power outages and/or radio link outages. For example, in some embodiments such information may be stored in non-volatile memory. In some cases this may allow header compression/decompression to resume immediately once power and/or a radio link is restored/resumed, assuming that the traffic unit flows upon which the information is based have not become stale and the information is still relevant to active traffic unit flows.

It is to be understood that the particular examples of header compression discussed above are merely examples provided for illustrative purposes only. More generally, other forms of header compression are contemplated.

Bit-level bulk data compressor 202 selectively applies bit-level bulk data compression to the communication traffic by accumulating blocks of bits, including headers and payloads of traffic units from the communication traffic, and operates on each block individually. The headers could be in their original form as received by the multiplexer 204, or in a compressed form if header compression was applied by the header compressor 200. Similar to the depiction of the selective application of header compression by header compressor 200, the selective application of bit-level bulk data compression by bit-level bulk data compressor 202 is depicted by way of a dashed-line bypass path through bit-level bulk data compressor 202. This is intended to indicate that bit-level bulk data compressor 202 may be configured such that it may apply bit-level bulk data compression to some communication traffic, while not applying bit-level bulk data compression to other communication traffic.

In some embodiments, the size of the blocks upon which the bit-level bulk data compressor 202 operates is user selectable. For example, in one particular embodiment, a user may select from block sizes that include 256, 512, 1024, 4000 or 8000 bytes. Larger blocks may compress more efficiently, but may come at the expense of an increased delay associated with the time to accumulate and/or process a larger block.

As noted above, in many cases communication traffic may include multiple traffic flows. In some embodiments, bit-level bulk data compressor 202 is configured to selectively apply bit-level bulk data compression to multiple traffic flows on a flow-by-flow basis. For example, bit-level bulk data compressor 202 may be configured to apply bit-level bulk data compression to traffic flow(s) identified as being of a first traffic flow type, such as FTP/TCP, and configured to not apply bit-level bulk data compression to traffic flow(s) identified as being of a second traffic flow type, such as VoIP, VidoIP or TDMoE.

Also as noted above, in some embodiments the multiplexer 204 may receive the communication traffic from one or more traffic queues. In some such embodiments, bit-level bulk data compressor 202 may be configured to selectively apply bit-level bulk data compression to the communication traffic on a queue-by-queue basis. For example, bit-level bulk data compressor 202 may be configured to accumulate blocks of bits from some traffic queues, and operate on those accumulated blocks individually, while traffic units from other traffic queues are allowed to pass without bit-level bulk data compression.

In some embodiments, bit-level bulk data compressor 202 is configured to instantiate multiple bit-level bulk data compressor instances $202_1$, $202_2$, $202_3$, . . . , $202_N$. Each bit-level bulk data compressor instance could be individually configurable to selectively apply bit-level bulk data compression to the communication traffic by accumulating blocks of bits from at least one of the traffic queues, and operate on each block individually. For example, one or more of the bit-level bulk data compressor instances $202_1$, $202_2$, $202_3$, . . . , $202_N$ may be multiplexed onto a single traffic queue or multiple traffic queues to selectively apply bit-level bulk data compression to communication traffic from the queue(s).

In one particular embodiment, each bit-level bulk data compressor instance can process 1 Gbps throughput. In other embodiments the throughput may be higher or lower.

In one embodiment, the bit-level bulk data compression applied by bit-level bulk data compressor 202 is based on a modified version of a lossless Lempel Ziv-Ross Williams (LZRW) compression algorithm, which itself is a modified version of a lossless Lempel Ziv (LZ) compression algorithm. However, it should be appreciated that other lossless bit-level bulk data compression techniques may be used in other embodiments. LZ based bulk data compression may be preferred in some cases because it can be implemented without relying on tables. This type of bulk data compression can instead be implemented so that it is completely dynamic, meaning that each compressed block is independently decompressible on its own and each compressed block is accompanied by decompression information that allows a bulk data decompressor at the far-end to decompress it. This also means that there is potentially no impact to bulk data compression when there are power outages or radio link outages, and therefore compression/decompression potentially resume operation once power or a radio link is restored.

As with the header compression applied by header compressor 200, the bit-level bulk data compression applied by bit-level bulk data compressor 202 is lossless and can be implemented so that it is non-expanding. For example, in an embodiment, if any expansion is detected, the uncompressed block is transmitted instead of the expanded block. In some embodiments, the check for expansion is implemented in a transparent, non-performance impacting process that happens in real time.

Demultiplexer 206 demultiplexes the output of bulk data compressor 202 and passes the demultiplexed output to an RF front end for transmission.

The compression gain performance that may be provided by combining header compression and bit-level bulk data compression as disclosed herein can be affected by numerous factors associated with the communication traffic that is to be processed, including, but not limited to:
  the mixture of traffic unit sizes;
  the number of traffic flows;

the type of traffic units (TCP or User Datagram Protocol (UDP), IPV4 or IPV6, Multiprotocol Label Switching (MPLS), General Packet Radio Service Tunnelling Protocol (GTP), etc.); and contents within the payload fields of the traffic units.

Generally, the combination of header compression and bit-level bulk data compression as described herein might not appreciably alter latency performance of a wireless communication link. In some cases, for smaller packet sizes, for example, the delay may be roughly equivalent to the delay without compression (+/−10 μs compression on or off). In other cases there may be an improvement in delay, for larger packets with good compressibility, for example.

Table 2 below shows some test results for one-way latency over a wireless communication link with and without compression as described herein for two different packet sizes tested on a 28 MHz bandwidth, 2048 Quadrature Amplitude Modulation (QAM), pseudorandom binary sequence (PRBS9) test pattern. It is to be understood that these test results are only representative of one very specific embodiment in one very specific testing scenario, and the same or different results may be obtained with other embodiments and/or other testing scenarios. As shown in the table, the latency with compression for the smaller packet size (1518 byte packets) is only marginally higher than that without compression, and the latency with compression for the larger packet size (9600 byte packets) is less than the latency without compression.

TABLE 2

| Packet Size | Latency without Compression (one-way, typical) | Latency with Compression (one-way, typical) |
|---|---|---|
| 1518 bytes | 256 μs | 257.2 μs |
| 9600 bytes | 618 μs | 486 μs |

Figure 4:
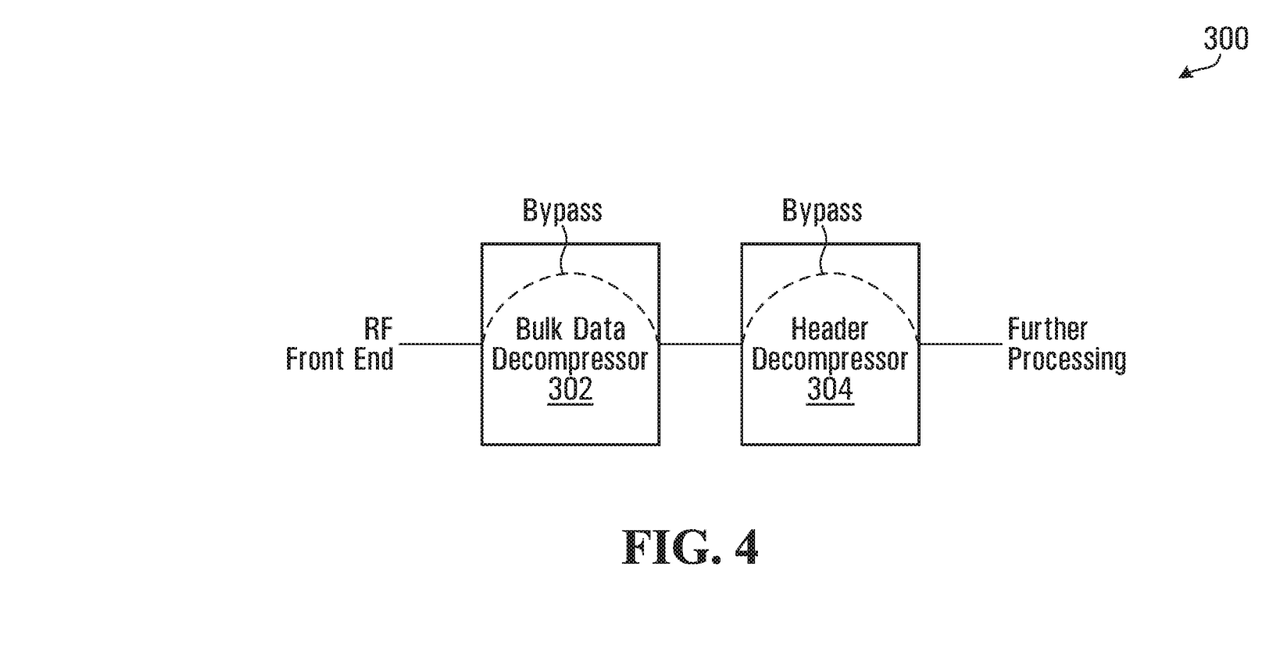
FIG. 4 is a block diagram of an example apparatus for decompressing communication traffic.

FIG. 4 is a block diagram of an example apparatus 300 for decompressing communication traffic. Such an apparatus may be employed, for example, as part of a decompressor in the communication circuitry of wireless communication device 108 to decompress compressed communication traffic received from wireless communication device 106. The example apparatus 300 shown in FIG. 4 includes a bit-level bulk data decompressor 302, which is operatively coupled to a header decompressor 304. The bit-level bulk data decompressor 302 and the header decompressor 304 could be implemented in hardware, firmware, one or more components, such as a processor, that execute software, or combinations thereof.

In operation, bit-level bulk data decompressor 302 receives communication traffic from an RF front end. The RF front end could be implemented as shown in FIG. 2 for the wireless communication device 106 with a transmit/receive device and a modem, for example. The communication traffic may or may not have been compressed with header compression and/or bit-level bulk data compression before being transmitted over a wireless communication link. Bit-level bulk data decompressor 302 selectively applies bit-level bulk data decompression to the communication traffic. The bit-level bulk data decompressor 302 accumulates blocks of bits, including headers and payloads of traffic units from the communication traffic, and operates on each block individually. Bit-level bulk data decompressor 302 then passes the resulting communication traffic to header decompressor 304. Header decompressor 304 then selectively applies header decompression to headers of traffic units from the communication traffic. The selective application of decompression by bit-level bulk data decompressor 302 and header decompressor 304 are depicted by way of dashed-line bypass paths to indicate that the decompressors may be configured to apply decompression to some communication traffic, while not applying it to other communication traffic.

In some embodiments, bit-level bulk data decompressor 302 receives bit-level bulk data decompression information in respect of the communication traffic and uses the bit-level bulk data decompression information when selectively applying bit-level bulk data decompression to the communication traffic. In some embodiments, the bit-level bulk data decompression information accompanies the communication traffic when it is transmitted over a wireless communication link.

In some embodiment, header decompression involves comparing a CID retrieved from a traffic unit to a mapping of CIDs to header information, and replacing the CID with corresponding header information if a match is found.

Figure 5:
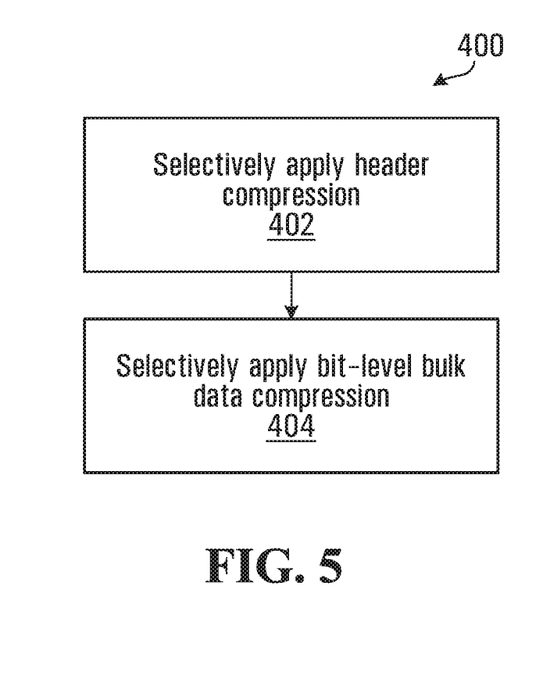
FIG. 5 is a flow diagram of an example method.

FIG. 5 is a flow diagram of an example method. The example method 400 relates to processing communication traffic that includes a plurality of traffic units, each traffic unit having a header and a payload. The example method 400 includes selectively applying header compression to headers of traffic units from the communication traffic, at 402. Bit-level bulk data compression is selectively applied to the communication traffic at 404. The bit-level bulk data compression selectively applied at 404 involves accumulating blocks of bits, including headers and payloads of traffic units from the communication traffic, and operating on each block individually.

The example method 400 is illustrative of one embodiment. In other embodiments, similar or different operations could be performed in a similar or different order. Various ways to perform the illustrated operations, as well as examples of other operations that may be performed, are described herein. Further variations may be or become apparent.

Figure 6:
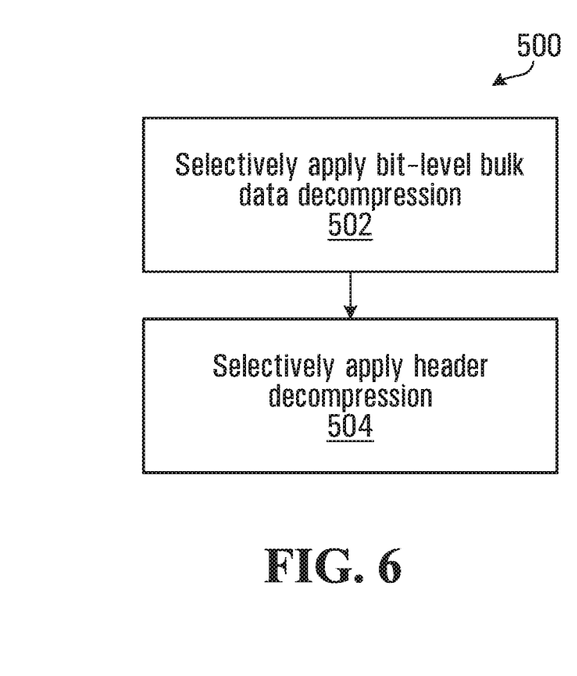
FIG. 6 is a flow diagram of another example method.

FIG. 6 is a flow diagram of another example method. The example method 500 also relates to processing communication traffic that includes a plurality of traffic units, each traffic unit having a header and a payload. The example method 500 includes selectively applying bit-level bulk data decompression to the communication traffic at 502. The bit-level bulk data decompression selectively applied at 502 involves accumulating blocks of bits, including headers and payloads of traffic units from the communication traffic, and operating on each block individually. Header decompression is selectively applied to headers of traffic units from the communication traffic at 504.

The example method 500 is illustrative of one embodiment. In other embodiments, similar or different operations could be performed in a similar or different order. Various ways to perform the illustrated operations, as well as examples of other operations that may be performed, are described herein. Further variations may be or become apparent.

What has been described is merely illustrative of the application of principles of embodiments of the present disclosure. Other arrangements and methods can be implemented by those skilled in the art.

For example, while the foregoing description refers to radio signals, the radio signals instead may be microwave signals. Embodiments of the invention are not limited to transmitting any particular type of signal, whether radio wave, microwave, or other types of signalling.

Similarly, while the above description refers to various examples of header compression techniques and bit-level bulk data compression techniques, embodiments of the invention are not limited to any particular header compression technique or any particular bit-level bulk data compression technique. Other lossless header and bit-level bulk data compression techniques may be used to compress data before it is transmitted to a receiver.

Furthermore, it should be appreciated that the compression techniques described herein are not limited to use in conjunction with any particular communication protocol. As such, although some of the compression techniques described herein are discussed in conjunction with TCP/IP and Ethernet protocols, more generally embodiments can be used in conjunction with any set of communication protocols. Similarly, while some embodiments may exploit knowledge of the type of traffic that is to be processed, in other embodiments the compression techniques disclosed herein may be used without any knowledge or assumption as to the type of traffic.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A communication traffic processing method comprising:
    receiving a first communication stream and a second communication stream, each of the first and second communication stream comprising a plurality of packets with each packet having a header and a payload;
    determining, based on a type of traffic of the first communication stream, that the packets of the first communication stream will compress more efficiently using header compression than using bit-level bulk data compression, and, in response applying header compression to the packets of the first communication stream; and
    determining, based on a type of traffic of the second communication stream, that the packets of the second communication stream will compress more efficiently using bit-level bulk data compression than using header compression, and, in response applying bit-level bulk data compression to the packets of the second communication stream by:
        accumulating multiple packets from the second communication stream into a block of data, wherein the block of data comprises a plurality of headers and
        performing bit-level data compression on the block of data.

2. The method of claim 1, wherein the type of traffic in the first communication stream comprises one or more of voice-over-IP (VoIP) traffic, video-over-IP (VidoIP) traffic, or Time Division Multiplexing over Ethernet (TDMoE).

3. The method of claim 1, wherein the type of traffic in the second communication stream comprises one or more of FTP traffic, TCP traffic, UDP traffic, or IPV4 traffic.

4. The method of claim 1, wherein the type of the first communication stream comprises delay sensitive traffic, and wherein the type of the second communication stream comprises delay insensitive traffic.

5. The method of claim 1, wherein determining that the packets of the first communication stream will compress more efficiently using header compression than using bit-level bulk data compression comprises determining that a header to payload ratio is above a predetermined amount.

6. The method of claim 1, wherein determining that the packets of the second communication stream will compress more efficiently using bit-level bulk data compression than using header compression comprises determining that the header to payload ratio is below a predetermined amount.

7. The method of claim 1, further comprising receiving the communication streams from a plurality of traffic queues, wherein applying header compression to the packets of the first communication stream comprises applying header compression to headers of packets from the first communication stream on a queue-by-queue basis.

8. The method of claim 1, further comprising receiving the communication streams from a plurality of traffic queues, wherein applying bit-level bulk data compression to the packets of the second communication stream comprises applying bit-level bulk data compression to the second communication stream on a queue-by-queue basis.

9. The method of claim 1, wherein a size of the blocks upon which the bit-level bulk data compression operates is user selectable.

10. A system comprising:
    at least one processor; and
    a memory communicatively coupled to the at least one processor, the memory storing instructions which, when executed, cause the at least one processor to perform operations comprising:
        receiving a first communication stream and a second communication stream, each of the first and second communication stream comprising a plurality of packets with each packet having a header and a payload;
        determining, based on a type of traffic of the first communication stream, that the packets of the first communication stream will compress more efficiently using header compression than using bit-level bulk data compression, and, in response applying header compression to the packets of the first communication stream; and determining, based on a type of traffic of the second communication stream, that the packets of the second communication stream will compress more efficiently using bit-level bulk data compression than using header compression, and, in response applying bit-level bulk data compression to the packets of the second communication stream by:

accumulating multiple packets from the second communication stream into a block of data, wherein the block of data comprises a plurality of headers; and performing bit-level data compression on the block of data.

11. The system of claim 10, wherein, wherein the type of traffic in the first communication stream comprises one or more of voice-over-IP (VoIP) traffic, video-over-IP (VidoIP) traffic, or Time Division Multiplexing over Ethernet (TDMoE) wherein the type of traffic in the second communication stream comprises one or more of FTP traffic, TCP traffic, UDP traffic, or IPV4 traffic.

12. The system of claim 10, wherein the type of the first communication stream comprises delay sensitive traffic, and wherein the type of the second communication stream comprises delay insensitive traffic.

13. The system of claim 10, wherein determining that the packets of the first communication stream will compress more efficiently using header compression than using bit-level bulk data compression comprises determining that a header to payload ratio is above a predetermined amount.

14. The system of claim 10, further comprising receiving the communication streams from a plurality of traffic queues, wherein applying header compression to the packets of the first communication stream comprises applying header compression to headers of packets from the first communication stream on a queue-by-queue basis.

15. The system of claim 10, further comprising receiving the communication streams from a plurality of traffic queues, wherein applying bit-level bulk data compression to the packets of the second communication stream comprises applying bit-level bulk data compression to the second communication stream on a queue-by-queue basis.

16. The system of claim 10, wherein a size of the blocks upon which the bit-level bulk data compression operates is user selectable.

17. A communication traffic processing method comprising:

receiving a first compressed communication stream and a second compressed communication stream, each of the first and second compressed communication streams comprising a plurality of packets with each packet having a header and a payload;

determining, that the packets of the first compressed communication stream were compressed using header compression, and, in response applying header decompression to the packets of the first compressed communication stream; and determining, that the packets of the second compressed communication stream were compressed using bit-level bulk data compression, and, in response applying bit-level bulk data decompression to the packets of the second communication stream by:

accumulating block of bits, including headers and payloads of multiple packets from the second compressed communication stream; and operating on each block individually.

18. The method of claim 17, further comprising receiving bit-level bulk data decompression information associated with the second compressed communication stream, wherein the bit-level bulk data decompression information is used when applying bit-level bulk data decompression to the packets of the second compressed communication stream.

19. The method of claim 17, wherein a type of traffic in the first compressed communication stream comprises one or more of voice-over-IP (VoIP) traffic, video-over-IP (VidoIP) traffic, or Time Division Multiplexing over Ethernet (TDMoE), and wherein a type of traffic in the second compressed communication stream comprises on or more of FTP traffic, TCP traffic, UDP traffic, or IPV4 traffic.

20. A system comprising:

at least one processor; and a memory communicatively coupled to the at least one processor, the memory storing instructions which, when executed, cause the at least one processor to perform operations comprising:

receiving a first compressed communication stream and a second compressed communication stream, each of the first and second compressed communication streams comprising a plurality of packets with each packet having a header and a payload;

determining, that the packets of the first compressed communication stream were compressed using header compression, and, in response applying header decompression to the packets of the first compressed communication stream; and determining, that the packets of the second compressed communication stream were compressed using bit-level bulk data compression, and, in response applying bit-level bulk data decompression to the packets of the second compressed communication stream by:

accumulating block of bits, including headers and payloads of multiple packets from the second compressed communication stream; and operating on each block individually.

21. The system of claim 20, further comprising receiving bit-level bulk data decompression information associated with the second compressed communication stream, wherein the bit-level bulk data decompression information is used when applying bit-level bulk data decompression to the packets of the second compressed communication stream.

22. The system of claim 20, wherein a type of traffic in the first compressed communication stream comprises one or more of voice-over-IP (VoIP) traffic, video-over-IP (VidoIP) traffic, or Time Division Multiplexing over Ethernet (TDMoE).

23. The system of claim 20, wherein a type of traffic in the second compressed communication stream comprises on or more of FTP traffic, TCP traffic, UDP traffic, or IPV4 traffic.

* * * * *